United States Patent
Eilam

(10) Patent No.: US 9,367,931 B1
(45) Date of Patent: Jun. 14, 2016

(54) MOTION VECTORS FOR CROSS-PLATFORM DISPLAY

(75) Inventor: Eldad Eilam, San Jose, CA (US)

(73) Assignee: HOPTO INC., Campbell, CA (US)

(*) Notice: Subject to any disclaimer, the term of this patent is extended or adjusted under 35 U.S.C. 154(b) by 0 days.

(21) Appl. No.: 13/341,227

(22) Filed: Dec. 30, 2011

(51) Int. Cl.
*G06T 9/00* (2006.01)

(52) U.S. Cl.
CPC .......................... *G06T 9/00* (2013.01)

(58) Field of Classification Search
CPC ......... H04L 67/02; H04L 67/34; H04L 69/16; H04L 63/0272; H04L 63/166; G06T 9/00; G06F 17/30902
See application file for complete search history.

(56) References Cited

U.S. PATENT DOCUMENTS

| | | | |
|---|---|---|---|
| 5,745,115 A | 4/1998 | Purple et al. | |
| 5,831,609 A | 11/1998 | London et al. | |
| 5,892,511 A | 4/1999 | Gelsinger et al. | |
| 6,329,984 B1 | 12/2001 | Boss et al. | |
| 6,421,070 B1 | 7/2002 | Ramos et al. | |
| 6,636,242 B2 | 10/2003 | Bowman-Amuah | |
| 6,710,786 B1 | 3/2004 | Jacobs et al. | |
| 6,758,394 B2 | 7/2004 | Maskatiya et al. | |
| 7,039,875 B2 | 5/2006 | Khalfay et al. | |
| 7,185,069 B2 | 2/2007 | Costin et al. | |
| 7,210,099 B2 | 4/2007 | Rohrabaugh et al. | |
| 7,325,027 B2 | 1/2008 | Grown | |
| 7,418,472 B2 | 8/2008 | Shoemaker et al. | |
| 7,472,157 B2 | 12/2008 | Tolson et al. | |
| 7,631,328 B2 | 12/2009 | Clancy et al. | |
| 7,667,704 B2 | 2/2010 | Hogle | |
| 7,844,889 B2 | 11/2010 | Rohrabaugh et al. | |
| 7,877,703 B1 | 1/2011 | Fleming | |
| 8,073,954 B1 | 12/2011 | Tu et al. | |
| 8,108,830 B2 | 1/2012 | Bibr et al. | |
| 8,583,627 B1 | 11/2013 | Kamvar et al. | |
| 8,763,054 B1 | 6/2014 | Eilam | |
| 8,763,055 B1 | 6/2014 | Eilam | |
| 8,775,545 B1 | 7/2014 | Eilam | |
| 8,776,152 B1 | 7/2014 | Eilam | |
| 8,856,262 B1 | 10/2014 | Eilam | |

(Continued)

FOREIGN PATENT DOCUMENTS

WO  WO 00/30729  6/2000
WO  WO 2004/059938  7/2004

OTHER PUBLICATIONS

U.S. Appl. No. 13/341,222, Office Action mailed Jan. 27, 2014.

(Continued)

*Primary Examiner* — Maurice L McDowell, Jr.
*Assistant Examiner* — Raffi Isanians
(74) *Attorney, Agent, or Firm* — Polsinelli LLP

(57) ABSTRACT

Data including information regarding a display of the host device may be received. A display of a client device may correspond to the display of the host device. Information regarding the display of the host device may be monitored for changes. When a change is detected, a movement of an image may be identified. Instructions may be generated regarding the changes to the display. A client device may process such instructions to incorporate the detected change while maintaining a remaining portion of the display. The instructions may include a motion vector command for the image movement and a command to fill in space vacated by the moving image. As such, the client device is not required to re-process and re-render an entire display where a change pertains to only a portion thereof.

19 Claims, 3 Drawing Sheets

(56) References Cited

U.S. PATENT DOCUMENTS

| | | | |
|---|---|---|---|
| 8,990,363 B1 | 3/2015 | Currey | |
| 9,106,612 B1 | 8/2015 | Currey | |
| 9,124,562 B1 | 9/2015 | Currey | |
| 9,218,107 B1 | 12/2015 | Eilam | |
| 9,223,534 B1 | 12/2015 | Eilam | |
| 9,250,782 B1 | 2/2016 | Hsu | |
| 9,292,157 B1 | 3/2016 | Hsu | |
| 2002/0103906 A1 | 8/2002 | Knight et al. | |
| 2002/0196378 A1* | 12/2002 | Slobodin et al. | 348/744 |
| 2003/0053091 A1 | 3/2003 | Tanaka et al. | |
| 2003/0058286 A1 | 3/2003 | Dando | |
| 2003/0069923 A1 | 4/2003 | Peart | |
| 2003/0182628 A1 | 9/2003 | Lira | |
| 2003/0208529 A1 | 11/2003 | Pendyala et al. | |
| 2004/0024899 A1 | 2/2004 | Sturrock et al. | |
| 2004/0177155 A1 | 9/2004 | Enokida et al. | |
| 2004/0205185 A1 | 10/2004 | Leonik | |
| 2004/0205715 A1 | 10/2004 | Taylor | |
| 2004/0267813 A1 | 12/2004 | Rivers-Moore et al. | |
| 2005/0080915 A1 | 4/2005 | Shoemaker et al. | |
| 2005/0198100 A1 | 9/2005 | Goring et al. | |
| 2005/0223100 A1 | 10/2005 | Chen et al. | |
| 2005/0235214 A1 | 10/2005 | Shimizu et al. | |
| 2005/0240873 A1 | 10/2005 | Czerwinski et al. | |
| 2006/0002315 A1 | 1/2006 | Theurer et al. | |
| 2006/0020904 A1 | 1/2006 | Aaltonen et al. | |
| 2006/0055701 A1 | 3/2006 | Taylor et al. | |
| 2006/0082581 A1 | 4/2006 | Schmieder et al. | |
| 2006/0082582 A1 | 4/2006 | Schmieder et al. | |
| 2006/0082583 A1 | 4/2006 | Leichtling et al. | |
| 2006/0085550 A1 | 4/2006 | Schmieder et al. | |
| 2006/0087512 A1 | 4/2006 | Schmieder et al. | |
| 2006/0149810 A1 | 7/2006 | Koo et al. | |
| 2006/0184982 A1 | 8/2006 | Paz et al. | |
| 2006/0195523 A1 | 8/2006 | Juang et al. | |
| 2006/0225037 A1 | 10/2006 | Glein et al. | |
| 2006/0227141 A1 | 10/2006 | Hogle | |
| 2006/0274302 A1 | 12/2006 | Shylanski et al. | |
| 2007/0005693 A1 | 1/2007 | Sampath et al. | |
| 2007/0016651 A1 | 1/2007 | Blagsvedt et al. | |
| 2007/0124536 A1 | 5/2007 | Carper | |
| 2007/0153319 A1 | 7/2007 | Moon et al. | |
| 2007/0162854 A1 | 7/2007 | Kikinis | |
| 2007/0220419 A1 | 9/2007 | Stibel et al. | |
| 2007/0229524 A1* | 10/2007 | Hendrey et al. | 345/552 |
| 2008/0009344 A1 | 1/2008 | Graham et al. | |
| 2008/0016155 A1 | 1/2008 | Khalatian | |
| 2008/0034320 A1 | 2/2008 | Ben-Shachar et al. | |
| 2008/0082604 A1 | 4/2008 | Mansour et al. | |
| 2008/0098291 A1 | 4/2008 | Bradley et al. | |
| 2008/0307047 A1 | 12/2008 | Jowett et al. | |
| 2008/0320396 A1 | 12/2008 | Mizrachi et al. | |
| 2009/0044103 A1 | 2/2009 | Chalecki et al. | |
| 2009/0100483 A1 | 4/2009 | McDowell | |
| 2009/0125838 A1 | 5/2009 | Bhogal et al. | |
| 2009/0157657 A1 | 6/2009 | Kim et al. | |
| 2009/0228779 A1 | 9/2009 | Williamson et al. | |
| 2009/0271501 A1 | 10/2009 | Shenfield et al. | |
| 2009/0292999 A1 | 11/2009 | LaBine et al. | |
| 2009/0320073 A1 | 12/2009 | Reisman | |
| 2010/0005396 A1 | 1/2010 | Nason et al. | |
| 2010/0111410 A1 | 5/2010 | Lu et al. | |
| 2010/0118039 A1 | 5/2010 | Labour | |
| 2010/0138809 A1 | 6/2010 | Shenfield et al. | |
| 2010/0162126 A1 | 6/2010 | Donaldson et al. | |
| 2010/0174974 A1 | 7/2010 | Brisebois et al. | |
| 2010/0279678 A1 | 11/2010 | Li et al. | |
| 2010/0281402 A1 | 11/2010 | Staikos et al. | |
| 2011/0032328 A1 | 2/2011 | Raveendran et al. | |
| 2011/0040826 A1 | 2/2011 | Chadzelek et al. | |
| 2011/0041092 A1 | 2/2011 | Zhang | |
| 2011/0078532 A1 | 3/2011 | Vonog et al. | |
| 2011/0078621 A1 | 3/2011 | Kanda | |
| 2011/0085016 A1 | 4/2011 | Kristiansen et al. | |
| 2011/0099494 A1 | 4/2011 | Yan et al. | |
| 2011/0113089 A1 | 5/2011 | Pryadarashan et al. | |
| 2011/0213855 A1 | 9/2011 | King | |
| 2011/0219331 A1 | 9/2011 | DeLuca et al. | |
| 2011/0231782 A1 | 9/2011 | Rohrabaugh et al. | |
| 2011/0239142 A1 | 9/2011 | Steeves et al. | |
| 2011/0252299 A1 | 10/2011 | Lloyd et al. | |
| 2011/0283304 A1 | 11/2011 | Roberts et al. | |
| 2011/0299785 A1 | 12/2011 | Albu et al. | |
| 2012/0005691 A1 | 1/2012 | Wong et al. | |
| 2012/0042275 A1* | 2/2012 | Neerudu et al. | 715/781 |
| 2012/0062576 A1 | 3/2012 | Rosenthal et al. | |
| 2012/0075346 A1 | 3/2012 | Malladi et al. | |
| 2012/0079043 A1 | 3/2012 | Brown et al. | |
| 2012/0084456 A1 | 4/2012 | Vonog et al. | |
| 2012/0093231 A1 | 4/2012 | Nozawa | |
| 2012/0102549 A1 | 4/2012 | Mazzaferri et al. | |
| 2012/0114233 A1 | 5/2012 | Gunatilake | |
| 2012/0117145 A1 | 5/2012 | Clift et al. | |
| 2012/0124497 A1 | 5/2012 | Kasoju et al. | |
| 2012/0166967 A1 | 6/2012 | Deimbacher et al. | |
| 2012/0169610 A1 | 7/2012 | Berkes et al. | |
| 2012/0192078 A1 | 7/2012 | Bai et al. | |
| 2012/0214552 A1 | 8/2012 | Sirpal et al. | |
| 2012/0223884 A1 | 9/2012 | Bi et al. | |
| 2012/0254453 A1 | 10/2012 | Lejeune et al. | |
| 2012/0266068 A1 | 10/2012 | Ryman et al. | |
| 2012/0266079 A1 | 10/2012 | Lee et al. | |
| 2012/0299968 A1 | 11/2012 | Wong et al. | |
| 2012/0317295 A1 | 12/2012 | Baird et al. | |
| 2013/0019263 A1 | 1/2013 | Ferren et al. | |
| 2013/0055102 A1 | 2/2013 | Matthews et al. | |
| 2013/0124609 A1 | 5/2013 | Martinez et al. | |
| 2013/0194374 A1 | 8/2013 | Kieft et al. | |
| 2013/0215129 A1 | 8/2013 | Keslin | |
| 2013/0229548 A1 | 9/2013 | Masuko | |
| 2014/0082511 A1 | 3/2014 | Weissberg et al. | |
| 2014/0223314 A1 | 8/2014 | Pinto et al. | |

OTHER PUBLICATIONS

U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/831,782 Final Office Action mailed Feb. 24, 2014.
U.S. Appl. No. 13/341,754, Office Action dated Jul. 31, 2013.
U.S. Appl. No. 13/341,238 Office Action dated Apr. 22, 2013.
U.S. Appl. No. 13/341,760 Office Action dated May 15, 2013.
U.S. Appl. No. 13/668,091 Office Action dated Apr. 23, 2013.
U.S. Appl. No. 13/670,163 Office Action dated May 7, 2013.
U.S. Appl. No. 13/668,095 Office Action dated Apr. 23, 2013.
Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., No. pp. 45,52, Mar. 25-29, 2006, doi:10.1109/VR.2006.6.
Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.
Boyaci, O.; Schulzrinne, Henning, "BASS Application Sharing System," Multimedia, 2008. ISM 2008. Tenth IEEE International Symposium on, vol., No. pp. 432,439, Dec. 15-17, 2008. doi:10.1109/ISM.2008.97.
Davidyuk, O., Georgantas, N., Issarny, V. & Riekki, J. (2009). MEDUSA: Middleware for End-User Composition of Ubiquitous Applications, In: Mastrogiovanni, F. & Chong, N.Y. (Eds.), Handbook of Research on Ambient Intelligence and Smart Environments: Trends and Perspectives IGI Global, to appear. Retrieved from: http://www.mediateam.oulu.fi/public.
Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces

(56) References Cited

OTHER PUBLICATIONS (AVI '08). ACM, New York, NY, USA, 260-267. DOI=10.1145/1385569.1385611 http://doi.acm.org/10.
Giullo Mori, Fabio Paterno, and Carmen Santoro. 2003. Tool support for designing nomadic applications. In Proceedings of the 8th international conference on Intelligent user interfaces (IUI '03). ACM, New York, NY, USA, 141-148. DOI=10.1145/604045.604069 http://doi.acm.org/10.1145/604045.604069.
Giullo Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.
Huifeng Shen; Yan Lu; Feng Wu; Shipeng Li, "A high-performance remote computing platform," Pervasive Computing and Communications, 2009. PerCom 2009. IEEE International Conference on, vol., No. pp. 1,6, Mar. 9-13, 2009. doi:10.1109/PERCOM.2009.4912855.
Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147. DOI=10.1145/964442.964469 http://doi.acm.org/10.1145/964442.964469.
Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in REACHES. In Proceedings of the 7th International Conference on Mobile and Ubiquitous Multimedia (MUM '08). ACM, New York, NY, USA. 105-108. DOI=10.1145/1543137.1543159 http://doi.acm.org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., No. pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,756 Office Action mailed Aug. 13, 2013.
U.S. Appl. No. 13/341,238 Final Office Action dated Sep. 17, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013.
U.S. Appl. No. 13/475,917 Office Action dated Nov. 18, 2013.
U.S. Appl. No. 13/668,091 Final Office Action dated Nov. 6, 2013.
U.S. Appl. No. 13/670,163 Office Action dated Nov. 6, 2013.
U.S. Appl. No. 13/668,095 Office Action dated Nov. 5, 2013.
U.S. Appl. No. 13/831,782 Office Action dated Nov. 6, 2013.
U.S. Appl. No. 13/831,783 Final Office Action dated Dec. 17, 2013.
U.S. Appl. No. 13/831,783 Office Action dated Sep. 3, 2013.
U.S. Appl. No. 13/831,783 Office Action dated Sep. 4, 2013.
U.S. Appl. No. 13/341,432 Office Action mailed Mar. 24, 2014.
U.S. Appl. No. 13/341,215 Office Action mailed Mar. 21, 2014.
U.S. Appl. No. 13/341,750 Office Action mailed Apr. 16, 2014.
U.S. Appl. No. 13/341,754, Office Action mailed Apr. 16, 2014.
U.S. Appl. No. 13/475,918 Office Action mailed Mar. 12, 2014.
Ali, Mir Farooq, et al., "Building multi-platform user interfaces with UIML." Computer-Aided Design of User Interfaces III. Springer Netherlands, 2002. 255-266.
Cuergo, "Ergonomic Guidelines for arranging a Computer Workstation—10 steps for users", Jun. 6, 2004. p. 1-5.
Holzinger, Andreas, Peter Treitler, and Wolfgang Slany. "Making apps useable on multiple different mobile platforms: On interoperability for business application development on smartphones." Multidisciplinary Research and Practice for Information Systems. Springer Berlin Heidelberg, 2012. 176-189.
Karch, Marziah, "Android in a Microsoft World." Android for Work. Apress, 2010. 93-102.
U.S. Appl. No. 13/341,207 Final Office Action mailed May 14, 2014.
U.S. Appl. No. 13/341,222, Final Office Action mailed May 15, 2014.
U.S. Appl. No. 13/341,756 Office Action mailed Jun. 11, 2014.
U.S. Appl. No. 13/341,232 Final Office Action mailed Jun. 18, 2014.
U.S. Appl. No. 13/341,765 Final Office Action mailed Jun. 24, 2014.
U.S. Appl. No. 13/490,330 Final Office Action mailed Jul. 17, 2014.
U.S. Appl. No. 13/475,911 Office Action mailed Jun. 24, 2014.
U.S. Appl. No. 13/475,912 Office Action mailed Jun. 24, 2014.
U.S. Appl. No. 13/475,913 Office Action mailed Jun. 24, 2014.
U.S. Appl. No. 13/831,782 Office Action mailed Jul. 17, 2014.
U.S. Appl. No. 13/341,425 Final Office Action mailed Aug. 29, 2014.
U.S. Appl. No. 13/490,327 Final Office Action mailed Aug. 21, 2014.
U.S. Appl. No. 13/490,329 Final Office Action mailed Aug. 11, 2014.
U.S. Appl. No. 13/475,918 Final Office Action mailed Sep. 30, 2014.
U.S. Appl. No. 13/831,783 Office Action mailed Sep. 19, 2014.
U.S. Appl. No. 13/831,786 Office Action mailed Sep. 16, 2014.
U.S. Appl. No. 13/831,786 Final Office Action mailed Dec. 17, 2013.
U.S. Appl. No. 13/831,786 Office Action mailed Sep. 4, 2013.
U.S. Appl. No. 13/341,432 Final Office Action mailed Nov. 19, 2014.
U.S. Appl. No. 13/341,215 Final Office Action mailed Dec. 12, 2014.
U.S. Appl. No. 13/341,756 Final Office Action mailed Oct. 22, 2014.
U.S. Appl. No. 13/341,207 Office Action mailed Jan. 27, 2015.
U.S. Appl. No. 13/341,750 Final Office Action mailed Jan. 30, 2015.
U.S. Appl. No. 13/341,222, Office Action mailed Jan. 29, 2015.
U.S. Appl. No. 13/341,754, Final Office Action mailed Jan. 9, 2015.
U.S. Appl. No. 13/341,232 Office Action mailed Feb. 6, 2015.
U.S. Appl. No. 13/341,765 Office Action mailed Mar. 16, 2015.
U.S. Appl. No. 13/490,330 Office Action mailed Mar. 11, 2015.
U.S. Appl. No. 13/475,911 Final Office Action mailed Mar. 10, 2015.
U.S. Appl. No. 13/475,912 Final Office Action mailed Mar. 10, 2015.
U.S. Appl. No. 13/475,913 Final Office Action mailed Jun. 24, 2014.
U.S. Appl. No. 13/831,782 Final Office Action mailed Feb. 13, 2015.
U.S. Appl. No. 13/341,432 Office Action mailed Mar. 27, 2015.
U.S. Appl. No. 13/341,754, Final Office Action mailed Jan. 13, 2015.
U.S. Appl. No. 13/341,756 Office Action mailed Mar. 27, 2015.
U.S. Appl. No. 13/475,913 Final Office Action mailed Mar. 10, 2015.
U.S. Appl. No. 14/312,925 Office Action mailed Mar. 25, 2015.
U.S. Appl. No. 13/341,215 Office Action mailed Apr. 17, 2015.
U.S. Appl. No. 14/337,659 Office Action mailed Mar. 31, 2015.
U.S. Appl. No. 13/341,425 Office Action mailed Apr. 10, 2015.
U.S. Appl. No. 13/490,327 Office Action mailed Apr. 13, 2015.
U.S. Appl. No. 13/490,329 Office Action mailed Apr. 3, 2015.
U.S. Appl. No. 13/831,786 Final Office Action mailed Apr. 9, 2015.
U.S. Appl. No. 13/341,207 Final Office Action mailed Jul. 28, 2015.
U.S. Appl. No. 13/341,750 Office Action mailed Jul. 22, 2015.
U.S. Appl. No. 13/341,754, Office Action mailed Aug. 19, 2015.
U.S. Appl. No. 13/341,222, Office Action mailed Jun. 26, 2015.
U.S. Appl. No. 13/475,911 Office Action mailed Oct. 22, 2015.
U.S. Appl. No. 14/312,925 Final Office Action mailed Oct. 29, 2015.
U.S. Appl. No. 14/960,902, filed Dec. 7, 2015, Eldad Eilam.
U.S. Appl. No. 14/937,733, filed Nov. 10, 2015, CK Hsu.
"A beginners guide to the Command Prompt," Jan. 9, 2007, Codejacked, p. 1, retrieved on Nov. 25, 2015 from http:/www.codejacked.com/abeginnersguidetothecommandprompt/.
U.S. Appl. No. 13/341,432 Final Office Action mailed Dec. 4, 2015.
U.S. Appl. No. 13/341,215 Final Office Action mailed Dec. 10, 2015.
U.S. Appl. No. 13/341,756 Final Office Action mailed Jan. 4, 2016.
U.S. Appl. No. 14/337,659 Final Office Action mailed Nov. 16, 2015.
U.S. Appl. No. 13/341,207, filed Dec. 30, 2011, Eldad Eilam, Automatic Adjustment for Cross-Platform Display.
U.S. Appl. No. 13/341,432, filed Dec. 30, 2011, Eldad Eilam, Cloud Based Automatic Adjustment for Cross-Platform Display.
U.S. Appl. No. 13/341,215, filed Dec. 30, 2011, Eldad Eilam, Managing Text for Cross-Platform Display.
U.S. Appl. No. 13/341,750, filed Dec. 30, 2011, Eldad Eilam, Cloud-based Text Management for Cross-Platform Display.
U.S. Appl. No. 13/341,222, filed Dec. 30, 2011, Eldad Eilam, Change Detection for Cross-Platform Display.
U.S. Appl. No. 13/341,754, filed Dec. 30, 2011, Eldad Eilam, Cloud Based Change Detection for Cross-Platform Display.

(56) References Cited

OTHER PUBLICATIONS

U.S. Appl. No. 13/341,756, filed Dec. 30, 2011, Eldad Eilam, Cloud-Based Motion Vectors for Cross-Platform Display.
U.S. Appl. No. 13/341,232, filed Dec. 30, 2011, Eldad Eilam, Client Side Detection of Motion Vectors for Cross-Platform Display.
U.S. Appl. No. 13/341,238, filed Dec. 30, 2011, Eldad Eilam, Image Hosting for Cross-Platform Display Over a Communication Network.
U.S. Appl. No. 13/341,760, filed Dec. 30, 2011, Eldad Eilam, Cloud-Based Image Hosting.
U.S. Appl. No. 13/341,425, filed Dec. 30, 2011, Eldad Eilam, Client Rendering.
U.S. Appl. No. 13/341,765, filed Dec. 30, 2011, Eldad Eilam, Cloud-Based Client Rendering.
U.S. Appl. No. 13/490,327, filed Jun. 6, 2012, Eldad Eilam, User Interface Management for Cross-Platform Display.
U.S. Appl. No. 13/490,329, filed Jun. 6, 2012, Eldad Eilam, User Interface Management for Cross-Platform Display.
U.S. Appl. No. 13/490,330, filed Jun. 6, 2012, Eldad Eilam, Cloud-Based User Interface Management for Cross-Platform Display.
U.S. Appl. No. 13/475,911, filed May 18, 2012, Eldad Eilam, Facilitating Responsive Scrolling for Cross-Platform Display.
U.S. Appl. No. 13/475,912, filed May 18, 2012, Eldad Eilam, Facilitating Responsive Scrolling for Cross-Platform Display.
U.S. Appl. No. 13/475,913, filed May 18, 2012, Eldad Eilam, Cloud-Based Facilitation of Responsive Scrolling for Cross-Platform Display.
U.S. Appl. No. 13/475,916, filed May 18, 2012, Robert W. Currey, Decomposition and Recomposition for Cross-Platform Display.
U.S. Appl. No. 13/475,917, filed May 18, 2012, Robert W. Currey, Decomposition and Recomposition for Cross-Platform Display.
U.S. Appl. No. 13/475,918, filed May 18, 2012, Robert W. Currey, Cloud-Based Decomposition and Recomposition for Cross-Platform Display.
U.S. Appl. No. 13/341,091, filed Nov. 2, 2012, Eldad Eilam, Cross-Platform Video Display.
U.S. Appl. No. 13/670,163, filed Nov. 6, 2012, Eldad Eilam, Cross-Platform Video Display.
U.S. Appl. No. 13/668,095, filed Nov. 2, 2012, Eldad Eilam, Cloud-Based Cross-Platform Video Display.
U.S. Appl. No. 13/831,782, filed Mar. 15, 2013, CK Hsu, Using Split Windows for Cross-Platform Document Views.
U.S. Appl. No. 13/831,783, filed Mar. 15, 2013, CK Hsu, Using Split Windows for Cross-Platform Document Views.
U.S. Appl. No. 13/831,786, filed Mar. 15, 2013, CK Hsu, Cloud-Based Usage of Split Windows for Cross-Platform Document Views.
U.S. Appl. No. 13/341,425 Final Office Action mailed Jan. 12, 2016.
U.S. Appl. No. 13/490,327 Final Office Action mailed Jan. 21, 2016.
U.S. Appl. No. 13/341,207 Office Action mailed Feb. 26, 2016.
US 8,689,268, 04/2014, Eilam (withdrawn)

* cited by examiner

MOTION VECTORS FOR CROSS-PLATFORM DISPLAY

BACKGROUND

1. Field of the Invention

The present invention generally relates to cross-platform display. More specifically, the present invention relates to motion vectors for cross-platform display.

2. Description of the Related Art

Individuals currently have a variety of options for communicating and carrying out transactions. Such options may include traditional desktop coming devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Additionally, using a finger on a touchscreen does not provide input as accurately as, for example, a mouse or physical keyboard. This difficulty is further heightened where the device lacks a tactile keyboard and instead relies on a keyboard display on a touchscreen. The size of the screen portion for display is further constrained when a keyboard is activated.

An additional complication is that some devices (e.g., mobile devices) may not have the same processing power or speed as other devices. For powerful devices, rendering complex displays may not be a problem. For less powerful devices, it may take a much longer time. This problem is further heightened where displays are continually changing (e.g., video).

Generally, host-rendered displays allow for an image to be rendered on a host device, processed (e.g., compressed), and then delivered to the client. In client-rendered displays, client devices are sent instructions for rendering a display. Some models rely on a combination of host- and client-rendering. For one particular type of display/changes, namely video displays, video codecs are components that compress or decompress video data based on various algorithms.

There is, therefore, a need in the art for improved systems and methods for generating motion vectors for cross-platform display.

SUMMARY OF THE CLAIMED INVENTION

Embodiments of the present invention include systems and methods for generating motion vectors for cross-platform display. Data including information regarding a display of the host device may be received. A display of a client device may correspond to the display of the host device. Information regarding the display of the host device may be monitored for changes. When a change is detected, a movement of an image may be identified. Instructions may be generated regarding the changes to the display. A client device may process such instructions to incorporate the detected change while maintaining a remaining portion of the display. The instructions may include a motion vector command for the image movement and a command to fill in space vacated by the moving image. As such, the client device is not required to re-process and re-render an entire display where a change pertains to only a portion thereof.

Various embodiments of the present invention include methods for generating motion vectors for cross-platform display. Such methods may include receiving data including information regarding a display of a host device, wherein a display of a client device corresponds to the display of the host device, detecting that a change has occurred in the display of the host device, identifying that the change includes movement of the at least one image, generating instructions for the identified portion of the display, wherein the client device executing the instructions maintains a remaining portion of the display while incorporating the detected change. Such commands may include a motion vector command for moving the at least one image from the first location to a second location and a command for filling in space previously occupied by the at least one image at the first location.

Embodiments of the present invention may further include systems for generating motion vectors for cross-platform display. Such systems may include a host device and a client device with a display that corresponds to a display of a host device. Some embodiments may additionally include an intermediary device, such as a server. In an exemplary implementation, the change detection, motion identification, and command generation may occur at the host and pushed to the client.

Other embodiments of the present invention include non-transitory computer-readable storage media on which is embodied instructions executable to perform a method for generating motion vectors for cross-platform display as previously set forth above.

DETAILED DESCRIPTION

Motion vectors for cross-platform display are provided. Data including information regarding a display of the host device may be received. A display of a client device may correspond to the display of the host device. Information regarding the display of the host device may be monitored for changes. When a change is detected, a movement of an image may be identified. Instructions may be generated regarding the changes to the display. A client device may process such instructions to incorporate the detected change while maintaining a remaining portion of the display. The instructions may include a motion vector command for the image movement and a command to fill in space vacated by the moving image. As such, the client device is not required to re-process and re-render an entire display where a change pertains to only a portion thereof.

Figure 1:
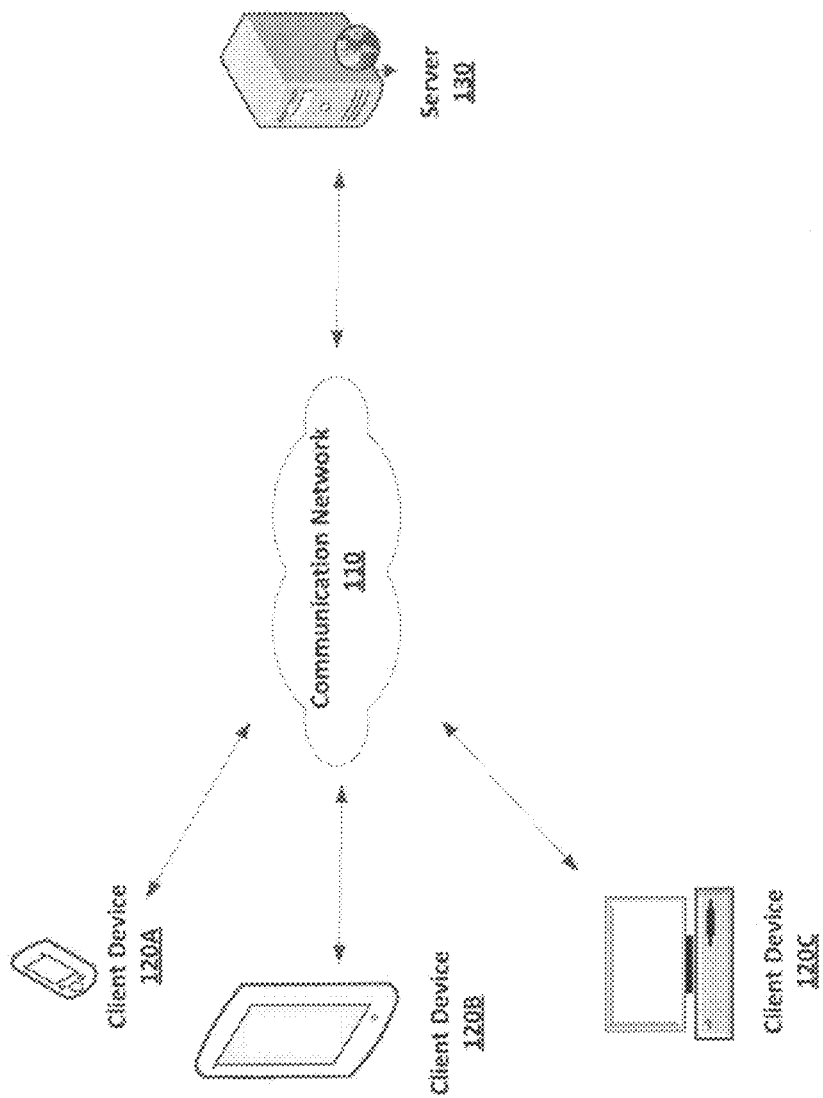
FIG. 1 illustrates a network environment in which an exemplary system for generating motion vectors for cross-platform display may be implemented.

FIG. 1 illustrates a network environment 100 in which a system for motion vectors for cross-platform display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., in the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic client devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Client devices 120 may also be configured to access data from other storage media, such as memory cards or disk drives as may be appropriate in the case of downloaded services. Client device 120 may include standard hardware computing components such as network and media interfaces, non-transitory computer-readable storage (memory), and processors for executing instructions that may be stored in memory.

Client device 120A is illustrated as a mobile phone or smartphone, while client device 120B is illustrated as a tablet computing device and client device 120C is illustrated as a desktop device. As can be seen, each client device 120 is sized differently and/or has different input options. Exemplary embodiments of the present invention allow for tasks and applications that are specific to one client device 120 (e.g., operating in a Microsoft Windows® environment) to be used and optimized for another client device 120 (e.g., operating in an Apple iOS® environment).

A client device 120 may include a client application, a client 3D library, and a client display driver. Collectively, these elements may enable the client and the client user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as client device 120C. Alternatively, server 130 may be located remotely (e.g., in the cloud) and may be associated with a third party that provides services in accordance with embodiments of the present invention. In some instances, the services may be provided via software (e.g., mobile application, software as a service) downloaded from server 130 to one or more client devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
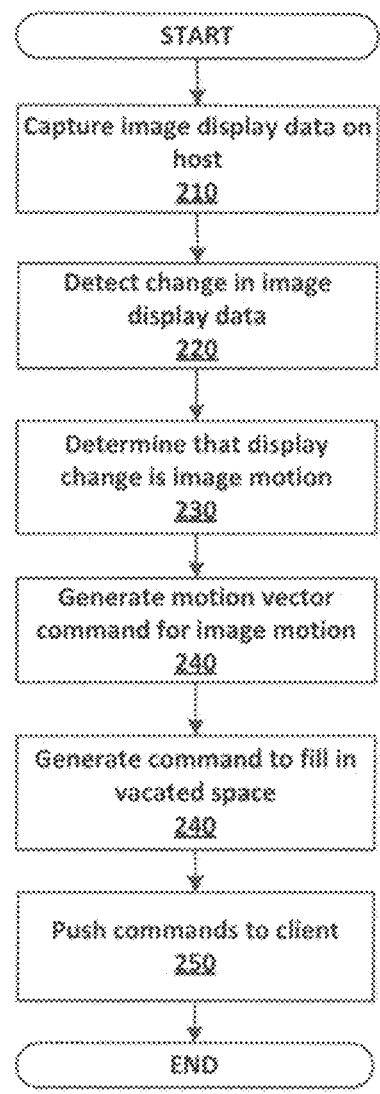
FIG. 2 is a flowchart illustrating an exemplary method for generating motion vectors for cross-platform display.

FIG. 2 illustrates a method 200 for motion vectors for cross-platform display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a display of a host—including at least one image—is captured. Changes in the display are detected and determined to include motion of at least one image. A motion vector command is generated to describe the motion of the image. In addition, a command for filling in the space (to be) vacated by the image. The commands may then be provided to the client. As such, the client may execute the commands to update its client display to correspond to the host display without having to render entire image(s) anew.

In step 210, information regarding a display of a host device 120C may be captured. Some types of applications may be associated with a visual, graphical display. A host device running such applications may generate a display to appear on a screen associated with the host device 120C. Information regarding the display may be indicative of what needs to be displayed (e.g., images, text, video). Such information may additionally indicate where an image or text appears on the screen.

In step 220, changes in the display of the host device are detected. Changes may be detected directly or indirectly based on observing or taking a snapshot of what is currently being displayed on the screen of the host device, evaluating information regarding or related to the display, or receiving flags or indicators of change. As noted above, some applications may be associated with a visual, graphical display, and depending on use or transaction(s) performed, changes to the display may occur. Some changes may be minor (e.g., changing a small portion of the display), while other changes may result in an entirely different display. An example of a partial change may include video where the background remain the same, but a character or object being filmed may move slightly.

In step 230, it is determined that the changes include motion of an image. There may be different ways to determine that the changes include image motion. For example, monitoring may have occurred on the pixel basis where changes in certain pixels are detected. For example, a collection of pixels may be determined to collectively make up an image, and that image may be determined to remain in the host display, albeit in a different location. Image copy operations, for example, may indicate that a change in the display includes motion of an image. Various indicators, such as image names or uniform resource locators (URLs), may also be associated with instructions indicating a different location on the display of the host device 120C.

In step 240, a motion vector command for an image identified as having moved may be generated. As noted above, a portion may be defined to be fine as a pixel or a collection of pixels. After a change has been detected (step 220) and identified as being motion of a particular image (step 230), a motion vector describing the motion of the image may be generated. For example, a detected change may be movement (e.g., a character walking) across the host display screen. Instructions are generated for moving the particular image (or parts thereof) that remain the same throughout the detected movement. As such, the entire image does not have to be rendered anew, and the graphics or video encoding process may be simplified.

Figure 3A:
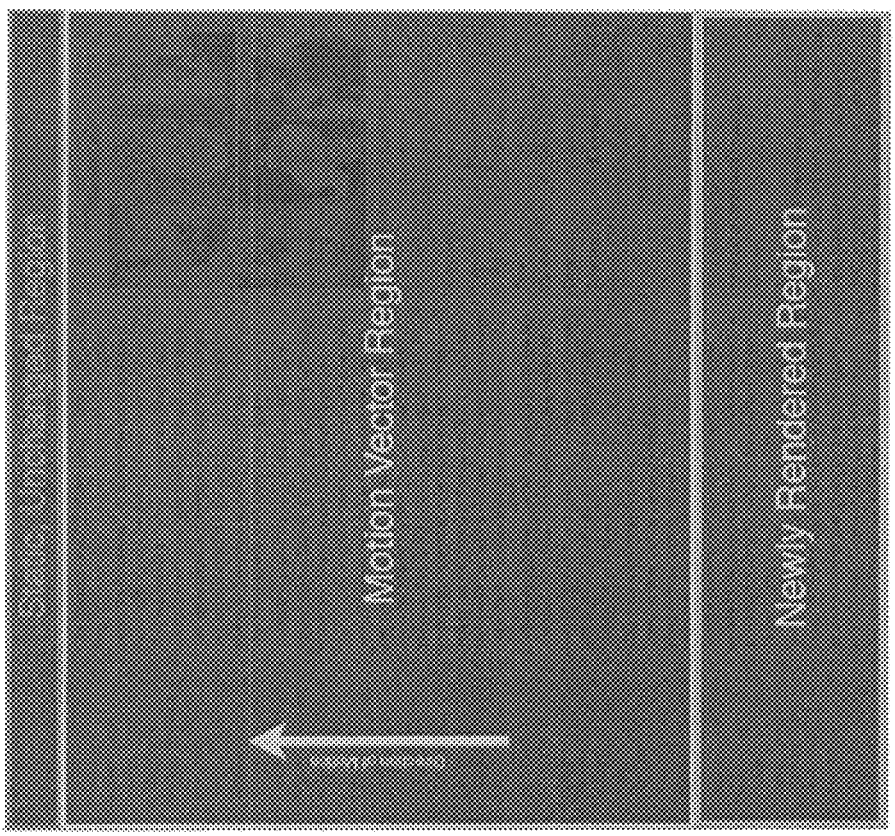
FIG. 3A is a screenshot of an exemplary display.
Figure 3B:
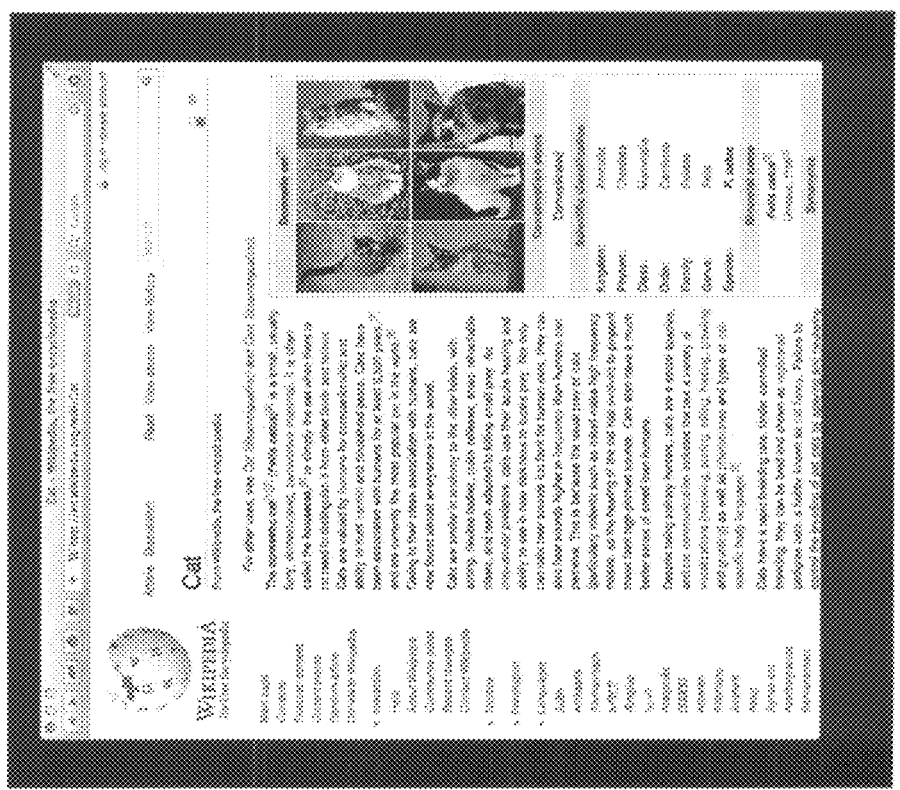
FIG. 3B is a diagram illustrating exemplary motion vectors applied to the display of FIG. 3A.

In step 250, a command for filling in vacated space is generated. When an image is moved, space may be vacated on screen, as well as other aspects that may require adjustment to the display. For example, a character may appear in one location on the host display screen in one moment, and in a subsequent moment, appear in another location. As such, the space occupied by the character at the first moment is vacated when it moves. That space may be filled in by a generated command. Such a command may merely fill in the background or other images in the display. FIG. 3A is a screenshot of an exemplary display. FIG. 3B is a diagram illustrating exemplary motion vectors and applied to the display of FIG. 3A.

In another example, a character walking across the screen is not merely gliding across screen unchanged. Differences in light and shadow, for example, may result from being in a different location. As such, slight adjustments may also be made to the image being moved. Some pixels may be brightened or darkened, for example.

In step 260, the commands are provided to the client device 120A for processing and rendering by graphics processor (or video codecs for videos). Rather than rendering the entire screen again, the client device 120A simply moves the particular image that is the subject of the instructions and fills in the space vacated by the moving image. The rest of the display on client device 120A may be maintained. As such, for small movement-based changes affecting only a portion of the display, the client device 120A need not expend processing power by unnecessarily rendering identical portions of a display multiple times. Because the client device 120A is responsive to changes (e.g., does not merely reload cached displays), the display of the client device 120A may remain current in accordance with what is current on the display of the host device 120C. As such, the client device 120A may generate a display that corresponds to that of the host device 120C in an efficient manner despite having different (e.g., less) processing resources.

Various embodiments of the present invention allow for the method 200 to be performed by an intermediary device (e.g., server 130) which may be associated with the host device, or reside elsewhere in the network (e.g., in the cloud). For example, server 130 may receive information regarding what the host device 120C is currently displaying. The server 130 may provide information to client device 120A so that client device 120A can generate a corresponding display. Server 130 may additionally monitor host device 120C to detect any changes, identify that the change include motion of an image, generate instructions specific to the image identified as moving and instructions to fill in the space vacated by the moving image, and provide the instructions to client device 120A for processing.

Alternatively, software located at either requesting client device 120A or host client device 120C may receive information regarding the display, monitors the information to identify changes occurring in the display and where, and generates the instructions specific to the image identified as moving and instructions to fill in the space vacated by the moving image, so that the client device 120A need only reprocess a portion of the display that includes the identified moving image and vacated space.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for motion vectors for cross-platform display, the method comprising:

sending information regarding a display on a host device display screen, wherein the display on the host device display screen includes a plurality of images, wherein the information is sent over a communication network to a client device, and wherein a display generated on the client device display screen corresponds to the display on the host device display screen; and executing instructions stored in memory, wherein execution of instructions by a processor:

detects that a change has occurred in the display on the host device display screen associated with the plurality of images, wherein the detected change is associated with one or more pixels of at least one image on the host device display screen, characterizes the detected change as movement of at least one portion of an image on the display of the host device display screen resulting from an image copy operation, wherein the moved portion is associated with an image name referenced in the image copy operation, identifies that the moved portion associated with the image name was moved from a first location to a second location within the host device display screen, wherein a new portion appears in the first location, generates instructions regarding the portion of the display associated with the image name and identified as having been moved from the first location to the second location, wherein the client device executing the instructions incorporates the change detected in the host device display screen into the display of the client device display screen, the instructions comprising:

a motion vector command for moving a corresponding portion of the image on the client device display from a corresponding first location to a corresponding second location, wherein the corresponding moved portion is not newly rendered, wherein the moved portion is updated based on its new location, and wherein moving the corresponding portion vacates space at the corresponding first location on the client device display screen, and a command for filling in the vacated space previously occupied by the moved corresponding portion at the corresponding first location, wherein the vacated space is newly rendered to correspond to the new portion in the display of the host device display screen.

2. The method of claim 1, wherein detecting that the change has occurred comprises taking a snapshot of a current display of the host device.

3. The method of claim 1, wherein detecting that the change has occurred comprises receiving an indicator of the change.

4. The method of claim 1, wherein detecting that the change has occurred comprises monitoring pixels in the display of the host device.

5. The method of claim 1, wherein the identified portion is identified as a collection of one or more pixels, and wherein detecting that the change has occurred comprises determining that the collection of pixels has moved within in the display of the host device.

6. The method of claim 1, wherein the moved portion is associated with a uniform resource locator (URL).

7. The method of claim 6, wherein detecting that the change has occurred is based on identifying that the URL is associated with instructions indicating the second location.

8. The method of claim 1, wherein detecting that a change has occurred in the display of the host device comprises determining that the portion identified as moving otherwise remains the same.

9. A system for motion vectors for cross-platform display, the system comprising:

a client device that:

receives information regarding a display on a host device display screen, wherein the display on the host device display screen includes a plurality of images, wherein the information is sent over a communication network from the host device, and generates a display corresponding to the display on the host device display screen; and a host device that:

detects that a change has occurred in the display on the host device display screen associated with the plurality of images, wherein the detected change is associated with one or more pixels of at least one image on the host device display screen, identifies the detected change as movement of at least one portion of an image on the display of the host device display screen resulting from an image copy operation, wherein the moved portion is associated with an image name referenced in the image copy operation, identifies that the moved portion associated with the image name was moved from a first location to a second location within the host device display screen, wherein a new portion appears in the first location, generates instructions regarding the portion of the display associated with the image name and identified as having been moved from the first location to the second location, the instructions comprising:

a motion vector command for moving a corresponding portion of the image on the client device display from a corresponding first location to a corresponding second location, wherein the corresponding moved portion is not newly rendered, wherein the moved portion is updated based on its new location, and wherein moving the corresponding portion vacates space at the corresponding first location on the client device display screen, and a command for filling in the vacated space previously occupied by the moved corresponding portion at the corresponding first location, wherein the vacated space is newly rendered to correspond to the new portion in the display of the host device display screen;

wherein the client device executing the instructions incorporates the detected change into the display on the client device display screen.

10. The system of claim 9, wherein detecting that the change has occurred comprises taking a snapshot of a current display of the host device.

11. The system of claim 9, wherein detecting that the change has occurred comprises receiving an indicator of the change.

12. The system of claim 9, wherein detecting that the change has occurred comprises monitoring pixels in the display of the host device.

13. The system of claim 9, wherein the identified portion is identified as a collection of one or more pixels, and wherein detecting that the change has occurred comprises determining that the collection of pixels has moved within in the display of the host device.

14. The system of claim 9, wherein the moved portion is associated with a uniform resource locator (URL).

15. The system of claim 14, wherein detecting that the change has occurred is based on identifying that the URL is associated with instructions indicating the second location.

16. The system of claim 9, wherein detecting that a change has occurred in the display of the host device comprises determining that the portion identified as moving otherwise remains the same.

17. A non-transitory computer-readable storage medium, having embodied thereon a program executable by a processor to perform a method for motion vectors for cross-platform display, the method comprising:

sending information regarding a display on a host device display screen, wherein the display on the host device display screen includes a plurality of images, wherein the information is sent over a communication network to a client device, and wherein a display generated on the client device display screen corresponds to the display on the host device display screen; and detecting that a change has occurred in the display on the host device display screen associated with the plurality of images, wherein the detected change is associated with one or more pixels of at least one image on the host device display screen;

characterizing the detected change as movement of at least one portion of an image on the display of the host device display screen resulting from an image copy operation, wherein the moved portion is associated with an image name referenced in the image copy operation, identifying that the moved portion associated with the image name was moved from a first location to a second location within the host device display screen, wherein a new portion appears in the first location; and generating instructions regarding the portion of the display associated with the image name and identified as having been moved from the first location to the second location, wherein the client device executing the instructions incorporates the change detected in the host device display screen into the display of the client device display screen, the instructions comprising:

a motion vector command for moving a corresponding portion of the image on the client device display from a corresponding first location to a corresponding second location, wherein the corresponding moved portion is not newly rendered, wherein the moved portion is updated based on its new location, and wherein moving the corresponding portion vacates space at the corresponding first location on the client device display screen, and a command for filling in the vacated space previously occupied by the moved corresponding portion at the corresponding first location, wherein the vacated space is newly rendered to correspond to the new portion in the display of the host device display screen.

18. The method of claim 1, wherein the client device does not reload cached displays.

19. The system of claim 9, wherein the client device does not reload cached displays.

\* \* \* \* \*